United States Patent
White

(10) Patent No.: US 8,931,030 B2
(45) Date of Patent: Jan. 6, 2015

(54) SYSTEM AND METHOD FOR APPRAISING PORTABLE MEDIA CONTENT

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1171 days.

(21) Appl. No.: 12/044,481

(22) Filed: Mar. 7, 2008

(65) Prior Publication Data

US 2009/0228947 A1 Sep. 10, 2009

(51) Int. Cl.
| | |
|---|---|
| *H04N 7/173* | (2011.01) |
| *H04N 21/25* | (2011.01) |
| *H04N 21/426* | (2011.01) |
| *H04N 21/466* | (2011.01) |
| *H04N 21/475* | (2011.01) |
| *H04N 21/658* | (2011.01) |

(52) U.S. Cl.
CPC ............. *H04N 7/173* (2013.01); *H04N 21/252* (2013.01); *H04N 21/42669* (2013.01); *H04N 21/4667* (2013.01); *H04N 21/4756* (2013.01); *H04N 21/6582* (2013.01)
USPC ................. 725/134; 725/9; 725/11; 725/109; 725/110; 705/14.25

(58) Field of Classification Search
CPC ................... H04N 21/23424; H04N 21/6582; H04N 21/4667; H04N 21/4756; H04N 21/25891; H04N 7/173; H04N 7/17318; H04N 7/163
USPC ............... 725/23, 24, 9–10, 13, 14, 109, 110, 725/134; 705/14

See application file for complete search history.

(56) References Cited

U.S. PATENT DOCUMENTS

| | | | |
|---|---|---|---|
| 6,317,881 | B1* | 11/2001 | Shah-Nazaroff et al. ....... 725/24 |
| 7,212,730 | B2 | 5/2007 | Boston et al. |
| 2002/0107758 | A1 | 8/2002 | Takakura et al. |
| 2002/0120925 | A1* | 8/2002 | Logan ............................... 725/9 |
| 2002/0161664 | A1 | 10/2002 | Shaya et al. |
| 2002/0178441 | A1* | 11/2002 | Hashimoto ..................... 725/11 |
| 2003/0105694 | A1 | 6/2003 | Conkwright et al. |
| 2003/0172374 | A1 | 9/2003 | Vinson et al. |
| 2003/0204438 | A1* | 10/2003 | Connelly et al. ................ 705/10 |
| 2004/0093261 | A1* | 5/2004 | Jain et al. ........................ 705/10 |
| 2005/0004880 | A1 | 1/2005 | Musgrove et al. |
| 2005/0028208 | A1* | 2/2005 | Ellis et al. ....................... 725/58 |
| 2005/0229213 | A1* | 10/2005 | Ellis et al. ....................... 725/58 |

(Continued)

FOREIGN PATENT DOCUMENTS

EP 0263635 4/1988

OTHER PUBLICATIONS

Scott White, "System and Method for Collecting Opinion Data", U.S. Appl. No. 11/972,474 dated Jan. 10, 2008, 37 Pages.

(Continued)

*Primary Examiner* — Brian T Pendleton
*Assistant Examiner* — Alan Luong
(74) *Attorney, Agent, or Firm* — Guntin & Gust, PLC; Jay H. Anderson

(57) ABSTRACT

A system that incorporates teachings of the present disclosure may include, for example, a media processor having a controller to detect a portable media storage device (PMSD), present media content supplied by the PMSD, present a survey to appraise the media content; receive a survey response, and transmit the survey response to a survey collection system identified by the PMSD. Other embodiments are disclosed.

25 Claims, 7 Drawing Sheets

(56) References Cited

U.S. PATENT DOCUMENTS

| | | |
|---|---|---|
| 2006/0280437 A1* | 12/2006 | Logan et al. .................... 386/94 |
| 2007/0192784 A1* | 8/2007 | Postrel ............................ 725/23 |
| 2007/0220554 A1 | 9/2007 | Barton et al. |
| 2008/0040194 A1 | 2/2008 | Trauth |
| 2008/0040205 A1* | 2/2008 | Gold et al. ...................... 705/10 |
| 2009/0150217 A1* | 6/2009 | Luff ............................... 705/10 |
| 2009/0313092 A1* | 12/2009 | Shah-Nazaroff et al. ....... 705/10 |

OTHER PUBLICATIONS

The Nielsen Company, "Nielsen Media Research", 1 page, www.nielsenmedia.com/nc/portal/site/Public, website last visited Dec. 3, 2007.

* cited by examiner

400

500

US 8,931,030 B2

SYSTEM AND METHOD FOR APPRAISING PORTABLE MEDIA CONTENT

FIELD OF THE DISCLOSURE

The present disclosure relates generally to surveying techniques and more specifically to a system and method for appraising portable media content.

BACKGROUND

Media content such as music, movies, video games, softcopies of books and so on can be distributed in portable media storage devices such as a digital video disc commonly referred to as a DVD, a high-definition DVD or HD DVD, a Blu-ray disc, a compact disc also referred to as a CD, or Flash memory. Media content distributed in portable media storage devices can be leased or purchased by consumers from retailers (e.g., Blockbuster™, Netflix™, etc.).

DETAILED DESCRIPTION

In one embodiment of the present disclosure entails a computer-readable storage medium having a computer instructions for detecting an insertion of a portable media storage device (PMSD), retrieving media content, a survey to appraise the media content, and associated metadata from the PMSD, presenting the media content, detecting a transition in the presentation of the media content according to the metadata, presenting the survey responsive to detecting the transition, receiving a response to the survey, and transmitting the survey response to a recipient identified by the metadata.

In another embodiment of the present disclosure entails a media processor having a controller to detect a PMSD, present media content supplied by the PMSD, present a survey to appraise the media content; receive a survey response, and transmit the survey response to a survey collection system identified by the PMSD.

In yet another embodiment of the present disclosure entails a method operating in a survey collection system involving receiving from a media processor a survey response that appraises media content of an entertainment nature distributed in a PMSD.

In another embodiment of the present disclosure entails a method involving distributing media content of an entertainment nature in PMSDs with a survey to appraise the media content.

Figure 1:
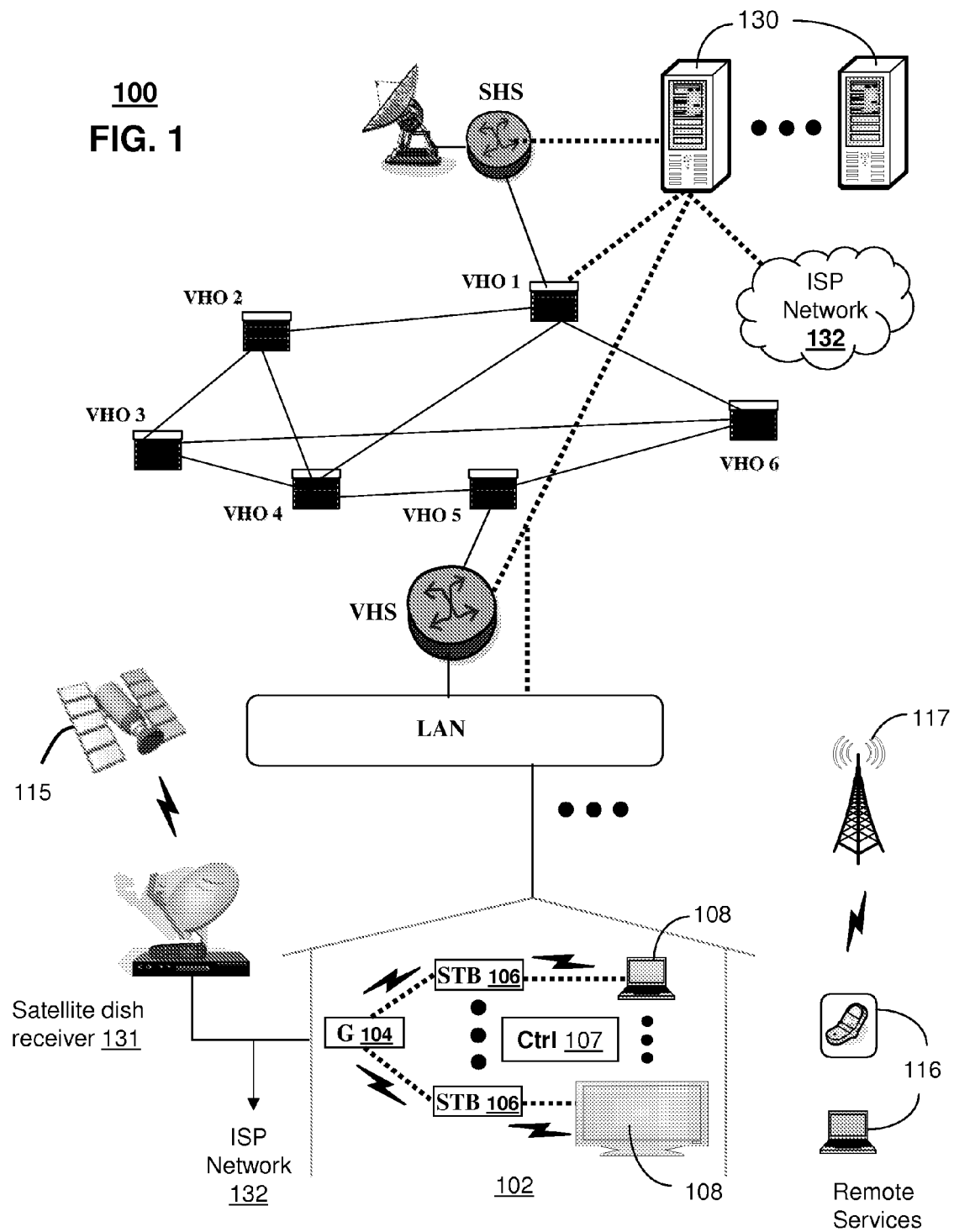
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a survey collection system (herein referred to as survey collection system 130) for collecting and processing consumer appraisals of media content distributed in portable media storage devices (PMSDs).

A PMSD can be represented by an optical media disc such as a digital video disk commonly referred to as a DVD, a high-definition DVD, a Blu-ray disc, or a compact disc also referred to as a CD. A PMSD can also be represented by a Flash memory commonly referred to as a "memory stick" which can come in many formats such as secure digital (SD) cards, mini SD cards, and micro SD cards. PMSDs can include any form of media content such as audio content (e.g., music, MP3 files, WAV files), still image content (e.g., JPEG, GIF), moving image content (e.g., MP4 files), textual content (e.g., news articles, books), or combinations thereof. It would be apparent to an artisan of ordinary skill in the art that a PMSD can represent any present or future portable memory device.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
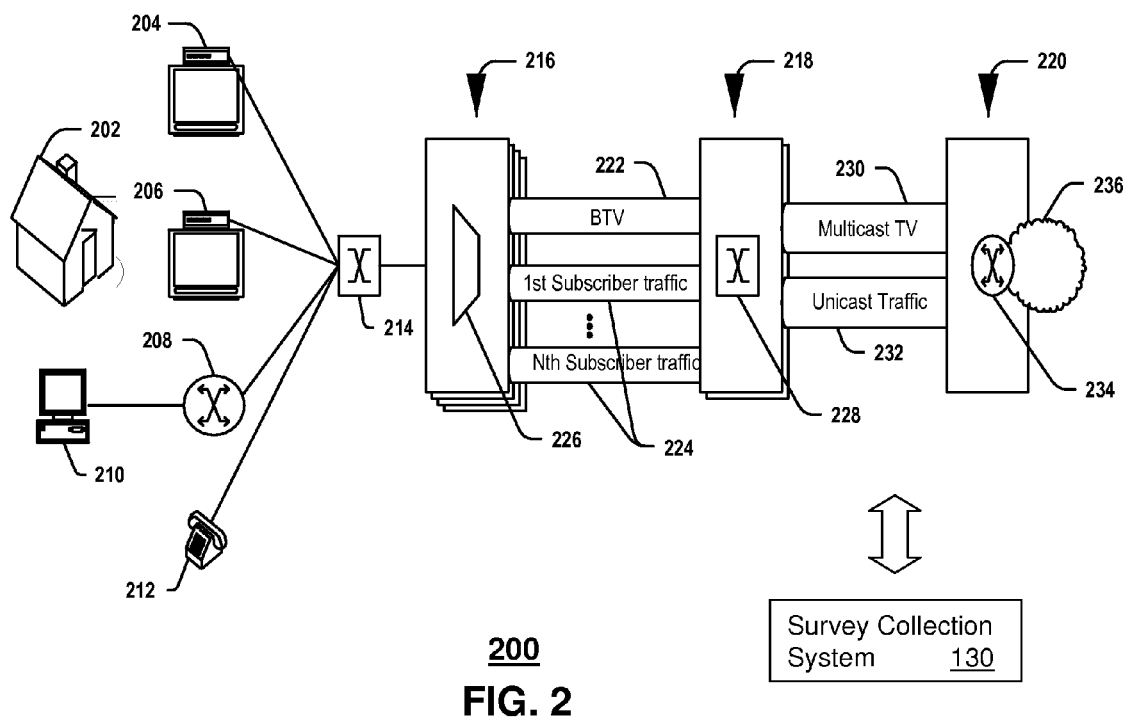

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a (DSLAM). The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The survey collection system 130 of FIG. 1 can be applied to the second communication system 200 for purposes similar to those described above.

Figure 3:
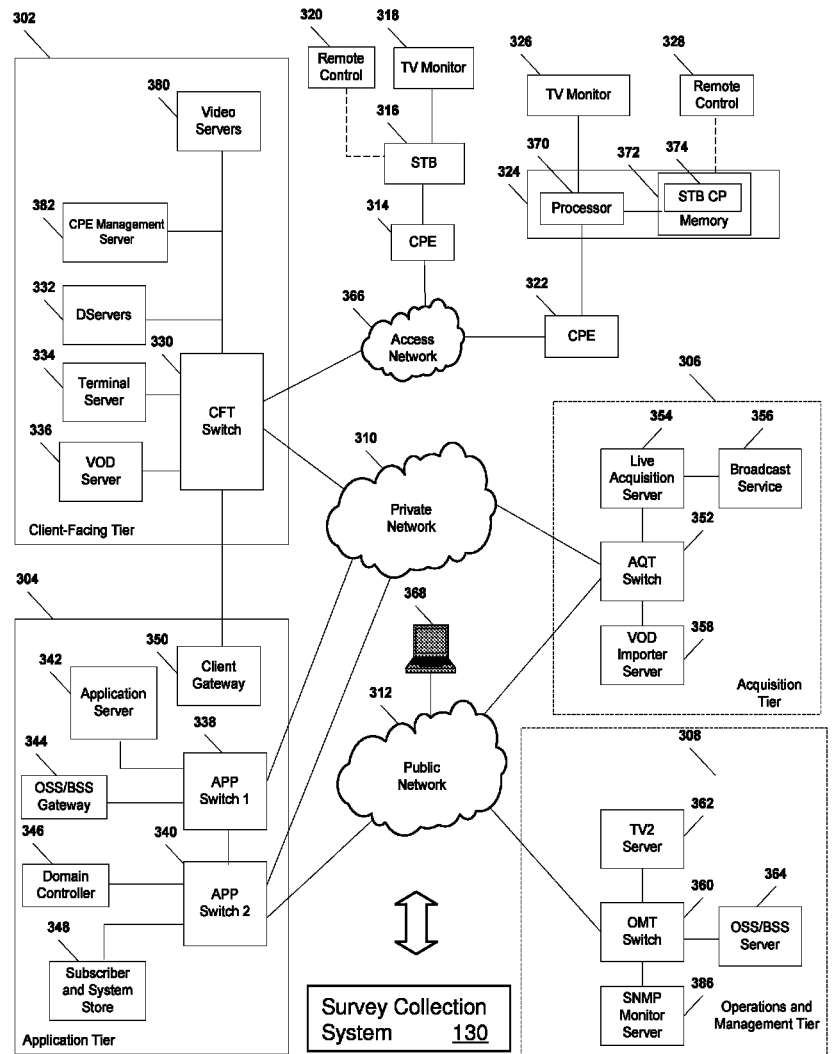

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330.

The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The survey collection system 130 of FIGS. 1-2 can also be applied to the third communication system 300 for purposes similar to those described above.

It should be apparent to one of ordinary skill in the art from the foregoing media system embodiments that other suitable media systems for distributing broadcast media content as well as peer-to-peer exchange of content can be applied to the present disclosure.

Figure 4:
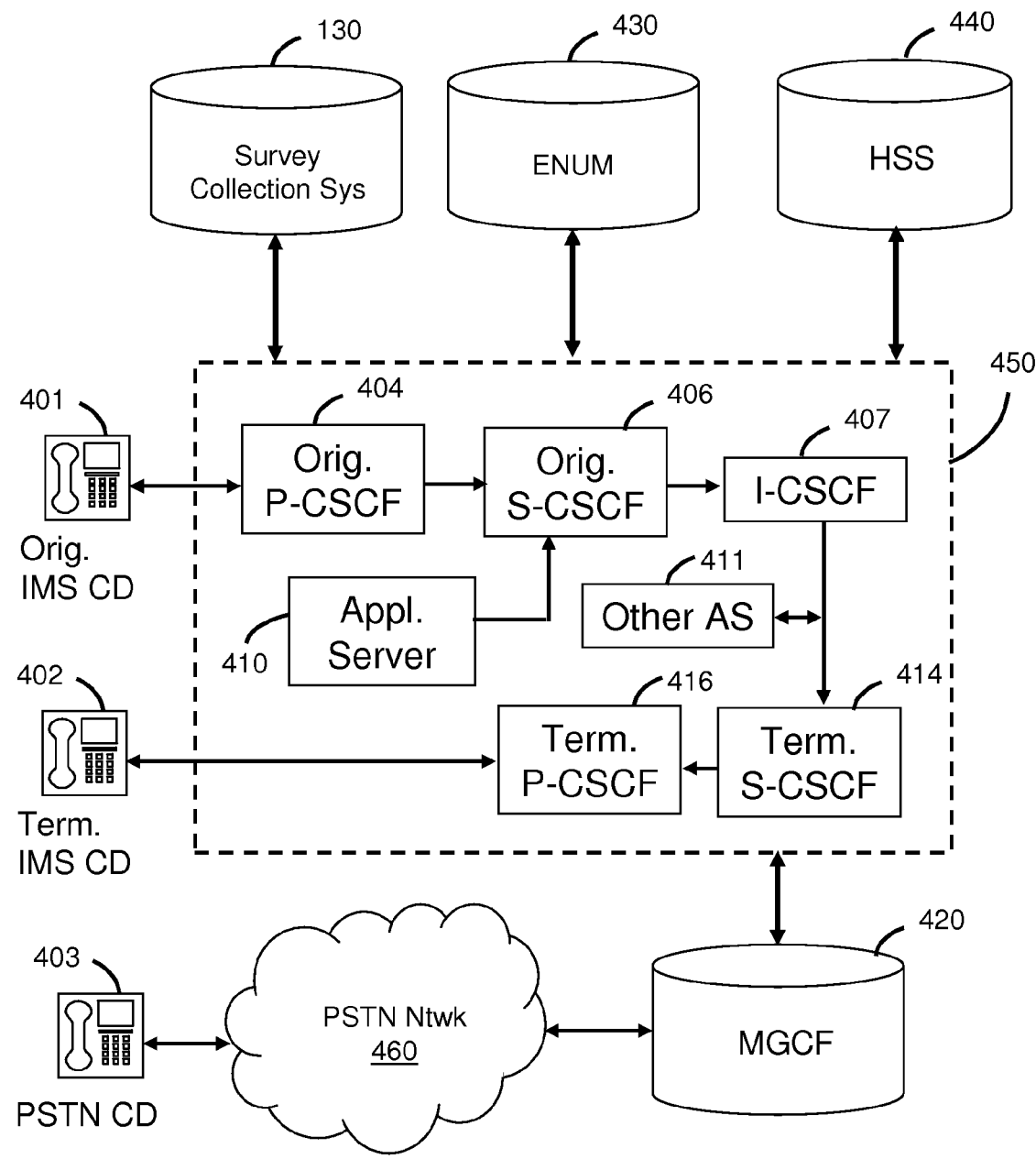

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 115 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 406 can submit queries to the ENUM system 430 to translate an E. 164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (not shown).

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the survey collection system 130 previously discussed for FIG. 1. In this representative embodiment, the survey collection system 130 can be accessed over a PSTN or VoIP channel of communication system 400 by common techniques such as described above.

Figure 5:
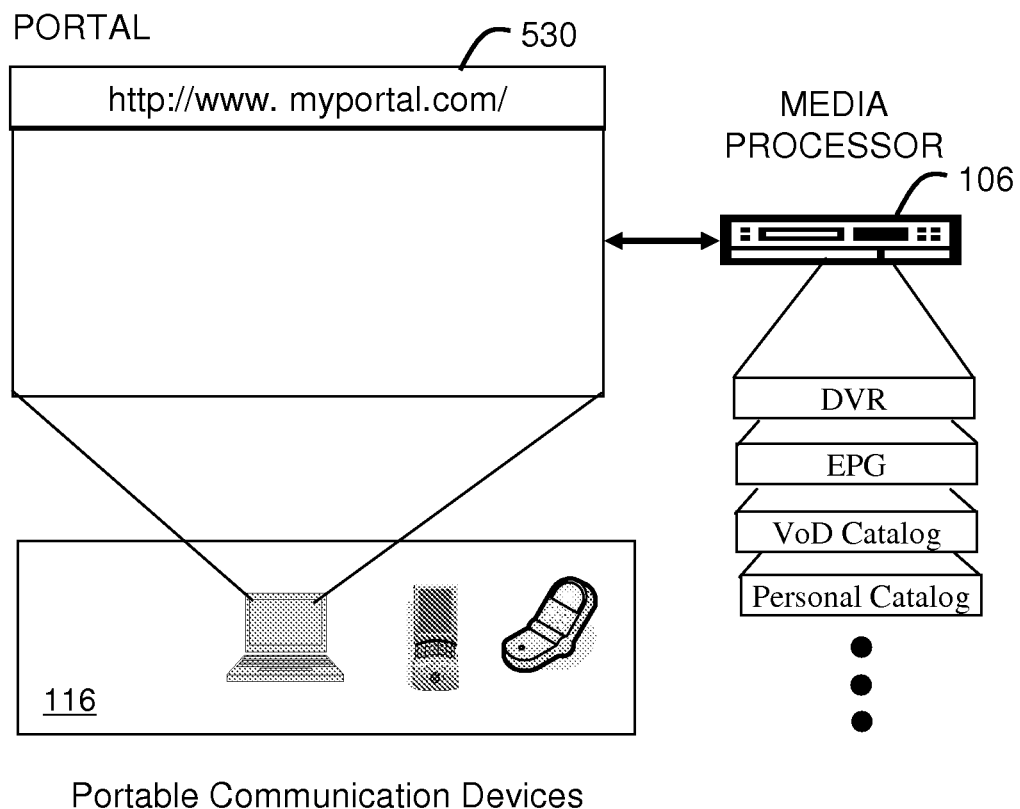
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
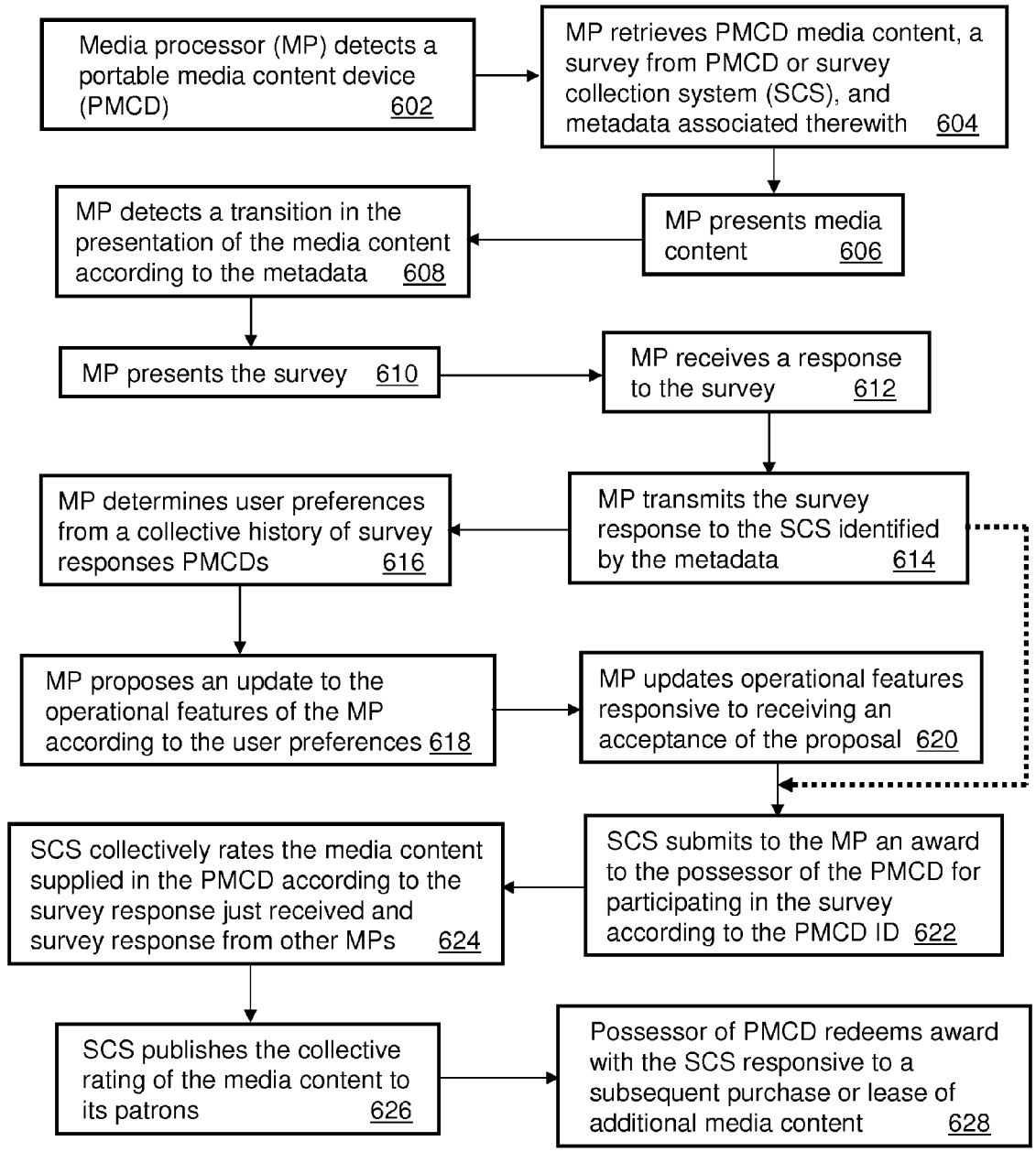
FIG. 6 depicts an exemplary method operating in portions of the communication systems of FIGS. 1-4.

FIG. 6 depicts an exemplary method 600 operating in portions of communication systems 100-400. Method 600 begins with step 602 in which a media processor such as the STB described in FIGS. 1-3 detects a PMSD. The PMSD can be detected by insertion into the STB (e.g., sliding a DVD or CD into an optical reader in the STB, or attaching a Flash memory stick to a USB port of the STB). The PMSD can also be coupled to the STB by way of a wireless interface (e.g., Bluetooth, WiFi, Zigbee). In step 604 the MP can be directed to retrieve from the PMSD media content supplied therein, a survey for appraising the media content, and metadata associated with the PMSD and its content. In another illustrative embodiment, the survey can be retrieved from the survey collection system (SCS) 130. In this embodiment, the metadata retrieved by the MP can provide a URL or URI that points to a location over the Internet where the survey can be retrieved.

In step 606, the MP can present the media content (audio, still or moving images, text or combinations thereof) at a media presentation device such as reference 108. At step 608, the MP can be directed according to the metadata to detect a transition in the presentation of the media content. The transition can be at the end of the presentation of the media content or at intermediate points (e.g., between tracks of a music album). The metadata can provide presentation coordinates, or demarcation points in time and/or location (e.g., tracks) to indicate an appropriate transition for presenting a survey. Upon detecting a transition point, the MP can present in step 610 the survey. The survey can include a battery of questions for assessing the viewer's (or listener's) appraisal of the media content. Alternatively or in combination the survey can include a simple rating system based on selectable iconic symbols (e.g., stars) or numbers (5-very satisfied, 4-satisfied, 3-unsure, 2-dissatisfied, and 1-very dissatisfied). Responses to the inquiries of the survey can prove useful to a recipient of the survey response. A recipient can represent a supplier of the PMSD (e.g., a retailer), a supplier of the media content (e.g., a media enterprise), or a producer of the media content (e.g., performers, directors, sponsors of the media content, etc.)

A viewer (or listener) of the media content can respond to the survey using a remote controller such as reference 107 to navigate through the inquiry(ies) by common means (e.g., navigation disk with select button). Once the MP detects the survey response is complete in step 612, the MP proceeds to step 614 where it transmits the survey response to the SCS 130 identified by the metadata. The SCS 130 can be identified by a URL, SIP URI, or other suitable identification means. The survey response can be accompanied by a PMSD identifier retrieved by the MP in step 604. The PMSD identifier can represent a unique identifier of the PMSD (e.g., a serial number or other suitable code). The PMSD identifier can be used by the SCS 130 to identify the possessor of the PMSD. This correlation can be accomplished at the time of purchase or lease of the PMSD.

For example, when a consumer purchases or leases the PMSD, the point of sale terminal can notify the SCS 130 of the purchase with descriptive information. The descriptive information can include the PMSD identifier or barcode which the SCS 130 can use to find the PMSD identifier in a database that tracks distribution of PMSDs. The information supplied by the point of sale terminal can further include an identification of the possessor such as a name, address, and/or subscriber account. At the time the transaction takes place, the SCS 130 can store in its database the possessor's identification with the unique PMSD identifier that identifies the PMSD just purchased or leased by the possessor. This approach can be used in a sale or lease of DVDs (movies), CDs (music), as well as other portable formats.

While the SCS 130 is processing the survey response supplied in step 614, the MP can perform its own analysis of the survey response in steps 616-618. For example, in step 616 the MP can determine user preferences from a collective history of survey responses of PMSDs purchased or leased by the subscriber of the MP. The MP can perform this step with common pattern recognition techniques which can determine and/or predict user behavior from the survey responses provided. Once user preferences have been determined, the MP can propose in step 618 an update to the operation features of the MP according to these preferences.

For example, the MP in step 616 may have determined that the user has a preference for sci-fi movies such as Star Wars, Star Trek, and so on. Knowing these preferences, the MP can search through an EPG to determine available viewing times of likely sci-fi candidates which may interest the viewer. Once one or more sci-fi candidates are found, the MP can submit a propose to the subscriber of the MP to update the DVR recording settings to record the sci-fi candidates found. If the subscriber accepts the proposal in whole or in part, the MP can be directed in step 620 to update the operational features of the MP in accordance with the acceptance terms.

In step 622, the SCS 130 can submit an award to the possessor of the PMSD for participating in the survey. The possessor as noted earlier can be identified from the unique PMSD identifier supplied in step 614 by the MP. A notice describing the award can be presented by the MP to the possessor of the PMSD in response to completing the survey. For example, upon completing the survey, the SCS 130 can transmit a notice describing the award to the MP which presents it on a display coupled thereto. The award can indicate that the possessor will receive a discount upon purchasing or leasing additional media content from one or more retailers.

The SCS 130 can collectively rate in step 624 the media content supplied in the PMSD according to the survey response received from the MP and the survey responses received from other MPs also surveying the same media content. The collective rating of the media content can be published in step 626 by the SCS 130 for patrons to review and utilize as an aid in selecting media content. The collective rating of the media content can be presented as a star rating system which can be updated periodically as survey responses are processed by the SCS 130. The foregoing steps of method 600 can be used to rate a catalog or library of media content which can be reviewed by patrons by way of portal 530 or by viewing listings at a store facility.

Once the possessor of the PMSD makes another purchase or lease of media content from the retailers identified by the SCS 130, the SCS can direct the point of sale terminal in step 628 to redeem the possessor's award (e.g., fee discount, free purchase of items, etc.). In another illustrative embodiment, the possessor can print a copy of the award notice presented in step 622 and request redemption with the print out as proof of the award. In yet another embodiment, the possessor can record an award identifier supplied in the notice (e.g., redemption award number) which can be presented to a clerk managing the point of sale terminal to redeem the award. Other suitable redemption methods can be applied to the present disclosure.

The foregoing embodiments can be applied for example in a movie rental setting with suppliers such as Blockbuster™ and Netflix™. For example, when a movie patron rents a DVD, HD DVD, or Blu-ray DVD, the point of sale terminal can provide the SCS 130 an identification of the PMSD and the patron, which the SCS can record in a local or remote database. During or after presentation of the movie, the MP of the patron can present a survey retrieved from the DVD or from the SCS 130 over the communication network of one of the media communication systems described earlier. The viewer of the DVD can respond to the survey, which the MP can transmit to the SCS 130 for further processing. If the survey is completed to the satisfaction of a service provider of the SCS 130, the SCS can submit an award notice to the MP which then presents it to the movie patron. The redemption process previously described can be applied in this illustration when the patron rents additional movies. Additionally, the MP can be programmed with steps 616-620 to propose operational updates to the MP that may serve the needs of the movie patron.

Method 600 can be applied to surveying other media types such as video games, music, books, or any other suitable form of entertainment media.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that the survey could be distributed by a retailer as a paper survey coupled with the sale or lease of the PMSD. The survey can be supplied in party by the SCS 130 and the PMSD. Other award techniques can be applied to the present disclosure. For example, the possessor of the PMSD may not receive an award until after more than one survey response has been received by the SCS 130. Accordingly, retailers of PMSDs can utilize a point system to incentivize patrons to rent or purchase and appraise a number of PMSDs before an award is offered.

Other suitable modifications that can be applied to the present disclosure without departing from the scope of the claims below. Accordingly, the reader is directed to the claims section for a fuller understanding of the breadth and scope of the present disclosure.

Figure 7:
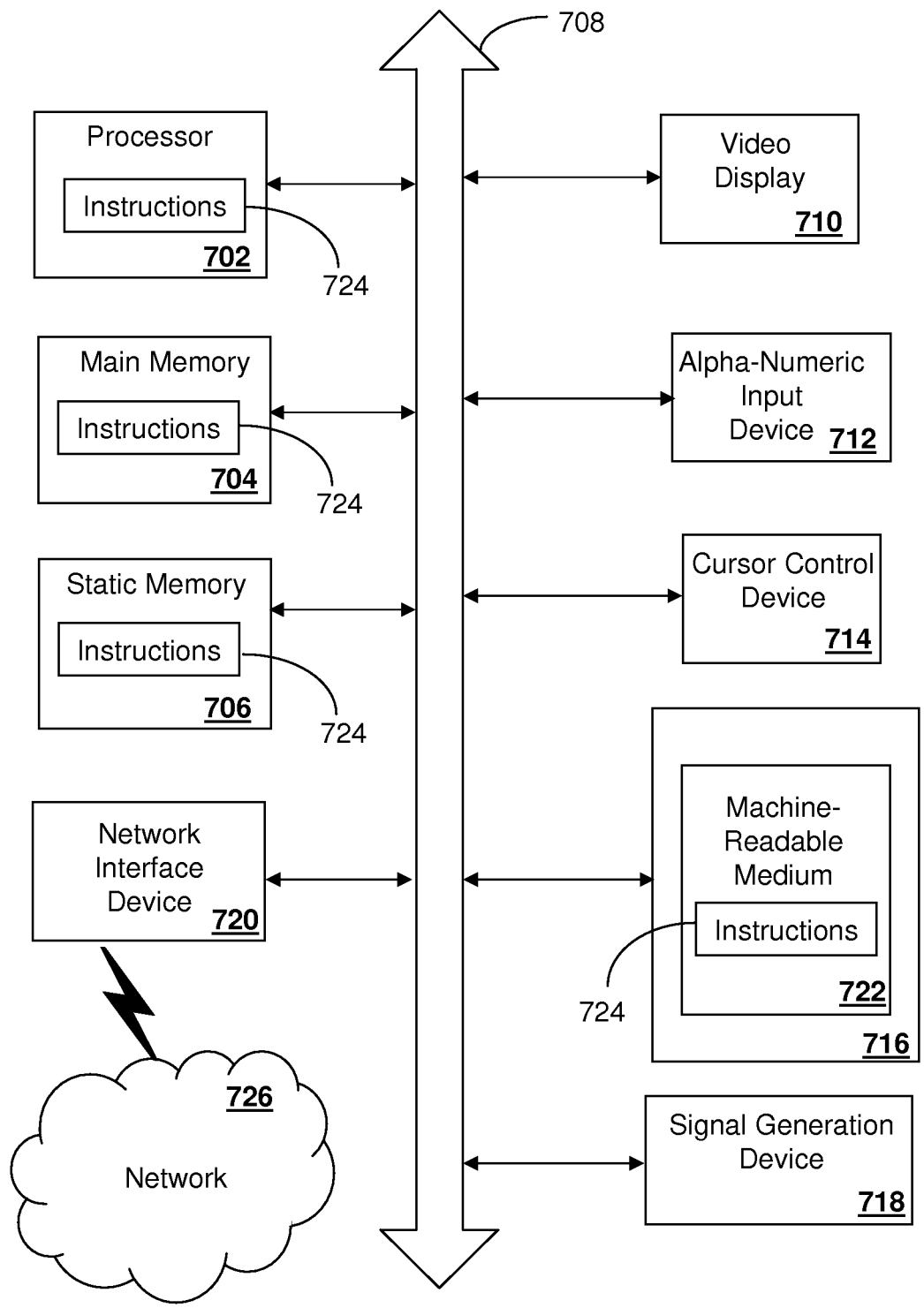
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising executable instructions which, when executed by a processor, cause the processor to perform operations comprising:

detecting an insertion of a portable media storage device into a media processor, wherein the portable media storage device stores media content, a survey to appraise the media content, a unique identifier for the portable media storage device, and associated metadata;

responsive to detecting the insertion of the portable media storage device, retrieving the media content, the survey, the unique identifier, and the associated metadata from the portable media storage device;

presenting the media content;

detecting a transition in the presentation of the media content according to the metadata;

presenting the survey responsive to detecting the transition;

receiving a response to the survey;

transmitting the survey response and the unique identifier to a recipient device identified by the metadata, the recipient device comprising a survey collection system;

receiving from the survey collection system a notice describing an award for participation in the survey; and presenting the notice describing the award; determining a user preference from a history of survey responses comprising the survey response and another survey response associated with another portable media storage device previously presented at the media processor;

composing a proposal to update operational features of the media processor regarding media presentations at the media processor, responsive to the determining; and updating the operational features of the media processor responsive to receiving an acceptance of the proposal, wherein the processor communicates with an application server device providing a program guide without the survey stored in the portable media storage device;

wherein the survey collection system is distinct from the application server device;

wherein the survey collection system is identified by a uniform resource locator or a session initiation protocol uniform resource identifier, wherein the survey collection system transmits the notice describing the award for presentation responsive to completion of the survey, wherein the survey collection system submits the award to a possessor of the portable media storage device identified from the unique identifier, the possessor of the portable media storage device being identified prior to the presenting of the media content.

2. The non-transitory storage medium of claim 1, wherein the portable media storage device corresponds to an optical media disc or a portable flash memory.

3. The non-transitory storage medium of claim 1, wherein the portable media storage device corresponds an optical media disc, a digital video disc, a high-definition digital video disc, a Blu-ray disc, or a compact disc.

4. The non-transitory storage medium of claim 1, wherein the media content comprises audio content, still image content, moving image content, textual content, or combinations thereof.

5. The non-transitory storage medium of claim 1, wherein the recipient device comprises a first device of a supplier of the portable media storage device, a second device of a supplier of the media content, or a third device of a producer of the media content.

6. The non-transitory storage medium of claim 1, wherein the storage medium operates in a set top box of a subscriber of media services, and wherein the operations further comprise sharing the survey with another set top box of another subscriber of the media services.

7. The non-transitory storage medium of claim 1, wherein the notice describing the award comprises an identifier for redeeming the award.

8. The non-transitory storage medium of claim 1, wherein the recipient device rates the media content supplied in the portable media storage device according to the survey response and another survey response, wherein the recipient device publishes collective ratings of the media content to its patrons, and wherein the award corresponds to a discount applicable to other media content leased or sold by the recipient device.

9. The non-transitory storage medium of claim 1, wherein the media processor comprises a digital video recorder, and the updating further comprises updating a recording setting to record a type of media content in accordance with the determined user preference.

10. The non-transitory storage medium of claim 1, wherein the media processor comprises one of a set top box and a digital video recorder, wherein the media processor operates in a media communication system, and wherein the media communication system corresponds to an internet protocol television communication system, a cable television communication system, a satellite television communication system, a public switched telephone network, a voice over internet protocol communication system, or an internet protocol multimedia subsystem combining the public switched telephone network and voice over internet protocol communication systems.

11. A media processor, comprising:

a memory to store instructions; and a controller coupled to the memory, wherein responsive to executing the instructions, the controller performs operations comprising:

detecting a presence of a portable media storage device, wherein the portable media storage device stores media content, a survey to appraise the media content, a unique identifier for the portable media storage device, and an identification of a survey collection system;

presenting the media content supplied by the portable media storage device;

presenting the survey supplied by the portable media storage device to appraise the media content responsive to the detected presence of the portable media storage device;

receiving a survey response to the survey; and transmitting the survey response and the unique identifier to the survey collection system identified by the portable media storage device;

receiving from the survey collection system a notice describing an award for participation in the survey;

presenting the notice describing the award;

determining a user preference from a history of survey responses comprising the survey response and another survey response associated with another portable media storage device previously presented at the media processor;

composing a proposal to update operational features of the media processor regarding media presentations at the media processor, responsive to the determining; and updating the operational features of the media processor responsive to receiving an acceptance of the proposal, wherein the media processor communicates with an application server device distinct from the survey collection system, the application server device providing a program guide without the survey supplied by the portable media storage device, wherein the identification comprises a uniform resource locator or a session initiation protocol uniform resource identifier, wherein the survey collection system transmits the notice describing the award for presentation responsive to completion of the survey, wherein the survey collection system submits the award to a possessor of the portable media storage device identified from the unique identifier, the possessor of the portable media storage device being identified prior to the presenting of the media content.

12. The media processor of claim 11, wherein the media content comprises audio content, still image content, moving image content, textual content, or combinations thereof, wherein the media processor comprises a set top box or a digital video recorder, wherein the portable media storage device corresponds to an optical media disc or a portable flash memory, and wherein the optical media disc corresponds to a digital video disk, a high-definition digital video disk, a Blu-ray disc, or a compact disc.

13. The media processor of claim 11, wherein the operations further comprise retrieving the survey from the portable media storage device or the survey collection system.

14. The media processor of claim 11, wherein the operations further comprise presenting the survey responsive to detecting a transition in the presentation of the media content.

15. The media processor of claim 14, wherein the operations further comprise detecting the transition according to metadata supplied by the portable media storage device.

16. The media processor of claim 11, wherein the portable media storage device is coupled to the media processor by an optical interface, an electro-mechanical interface, or a wireless interface.

17. A method comprising:
receiving, by a survey collection system, from a media processor a survey response that appraises media content of an entertainment nature distributed in a portable media storage device and presented by the media processor, wherein the portable media storage device stores a unique identifier for the portable media storage device and a survey and supplies the media processor the survey from which the survey response is produced;
transmitting, by the survey collection system, to the media processor a notice describing an award for participation in the survey; and
submitting, by the survey collection system, the award responsive to receiving a completed survey;
wherein the media processor communicates with an application server device providing a program guide without the survey supplied by the portable media storage device,
wherein the survey collection system is distinct from the application server device, and
wherein the survey collection system is identified by a uniform resource locator or a session initiation protocol uniform resource identifier stored in the portable media storage device,
wherein the survey collection system submits the award to a possessor of the portable media storage device identified from the unique identifier, the possessor of the portable media storage device being identified prior to presentation of the media content,
and wherein the media processor performs operations comprising
determining a user preference from a history of survey responses comprising the survey response and another survey response associated with another portable media storage device previously presented at the media processor;
composing a proposal to update operational features of the media processor regarding media presentations at the media processor, responsive to the determining; and
updating the operational features of the media processor responsive to receiving an acceptance of the proposal.

18. The method of claim 17, wherein the media processor further performs operations comprising:
detecting a presence of the portable media storage device;
presenting media content supplied by the portable media storage device;
presenting a survey to appraise the media content;
receiving the survey response; and
transmitting the survey response to the survey collection system.

19. The method of claim 18, wherein the portable media storage device is coupled to the media processor by an optical interface, an electro-mechanical interface, or a wireless interface, and wherein the method further comprises:
receiving, by the survey collection system, from the media processor a portable media storage device identifier retrieved by the media processor from the portable media storage device;
determining, by the survey collection system, from the portable media storage device identifier a possessor of the portable media storage device; and
submitting, by the survey collection system, the award to the possessor of the portable media storage device for responding to the survey.

20. The method of claim 17, wherein the media content comprises audio content, still image content, moving image content, textual content, or combinations thereof, wherein the media processor comprises a set top box or a digital video recorder, wherein the portable media storage device corresponds to an optical media disc or a portable flash memory, and wherein the optical media disc corresponds to a digital video disk, a high-definition digital video disk, a Blu-ray disc, or a compact disc.

21. The method of claim 17, further comprising rating, by the survey collection system, the media content supplied in the portable media storage device according to the survey response and additional survey responses received from other media processors.

22. The method of claim 17, further comprising:
identifying, by the survey collection system, in the survey response an identification of a possessor of the portable media storage device; and
recording, by the survey collection system, an award for the possessor.

23. The method of claim 22, further comprising redeeming the award for the possessor responsive to detecting a lease or purchase of additional media content by the possessor.

24. A method, comprising:
distributing, by a survey collection system, media content of an entertainment nature with a survey to appraise the media content, wherein the media content and the survey are stored in a portable media storage device and a unique identifier for the portable media storage device is stored on the portable media storage device; and
submitting, by the survey collection system, an award directed to a possessor of the portable media storage device responsive to receiving from the possessor a completed response to the survey stored in the portable media storage device,
wherein the media content is presented to the possessor via a media processor that communicates with an application server device providing a program guide without the survey stored in the portable media storage device,
wherein the survey collection system is distinct from the application server device, wherein the survey collection system is identified by a uniform resource locator or a session initiation protocol uniform resource identifier stored in the portable media storage device, wherein the possessor of the portable media storage device is identified from the unique identifier prior to the distributing of the media content, and wherein the media processor performs operations comprising determining a user preference from a history of survey responses comprising the survey response and another survey response associated with another portable media storage device previously presented at the media processor;

composing a proposal to update operational features of the media processor regarding media presentations at the media processor, according to the determined user preference; and updating the operational features of the media processor responsive to receiving an acceptance of the proposal.

25. The method of claim 24, wherein the media content comprises audio content, still image content, moving image content, textual content, or combinations thereof, wherein the portable media storage device corresponds to an optical media disc or a portable flash memory whereby the media content included therein is presentable by a media processor.

* * * * *